(12) United States Patent
He et al.

(10) Patent No.: US 8,428,396 B2
(45) Date of Patent: Apr. 23, 2013

(54) IMAGE INTERPOLATION METHOD AND APPARATUS, AND METHOD FOR OBTAINING INTERPOLATION COEFFICIENTS

(75) Inventors: Yun He, Beijing (CN); Zhongmou Wu, Beijing (CN); Xiaozhen Zheng, Shenzhen (CN); Jianhua Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 12/794,557

(22) Filed: Jun. 4, 2010

(65) Prior Publication Data

US 2010/0246998 A1    Sep. 30, 2010

Related U.S. Application Data

(63) Continuation of application No. PCT/CN2008/073326, filed on Dec. 3, 2008.

(30) Foreign Application Priority Data

Dec. 4, 2007 (CN) .......................... 2007 1 0195919

(51) Int. Cl.
*G06K 9/38* (2006.01)
*G06K 9/32* (2006.01)

(52) U.S. Cl.
USPC .......................................... 382/300; 382/260

(58) Field of Classification Search .......... 382/293–300; 375/224, 229, 285, 340, 344, 346, 350, 75; 342/904; 370/206
See application file for complete search history.

(56) References Cited

U.S. PATENT DOCUMENTS

| 7,046,726 B2 * | 5/2006 | Jayaraman et al. ........... 375/233 |
| 7,526,138 B1 * | 4/2009 | Souchard ...................... 382/260 |
| 2002/0012464 A1 | 1/2002 | Han et al. |

(Continued)

FOREIGN PATENT DOCUMENTS

| CN | 1329435 A | 1/2002 |
| CN | 1492688 A | 4/2004 |

(Continued)

OTHER PUBLICATIONS

Vitas et al, Coding of Coefficients of two-dimensional non-separable Adaptive Wiener Interpolation Filter, Visual Communications and Image Processing 2005. Edited by Li, Shipeng; Pereira, Fernando; Shum, Heung-Yeung; Tescher, Andrew G. Proceedings of the SPIE, vol. 5960, pp. 623-631 (2005).*

(Continued)

*Primary Examiner* — Andrae S Allison

(57) ABSTRACT

An image interpolation method includes: obtaining pixel values of integer pixel points and/or sub-pixel points in the row, column or any other directions of pixel points; obtaining pre-calculated interpolation coefficients, and interpolating the pixel points. A method for obtaining image interpolation coefficients includes: solving a one-dimensional Wiener-Hopf equation to obtain needed interpolation coefficients in different directions. An image interpolation apparatus performs interpolation filter processing on pixel points by using a first obtaining module, a second obtaining module, and a first calculating module. With the image interpolation method and apparatus, and the method for obtaining interpolation coefficients, the interpolation filter accuracy of the pixel points may be improved, the search accuracy of pixel points may be improved, and thus a more accurate matching block may be obtained in a reference image.

13 Claims, 4 Drawing Sheets

U.S. PATENT DOCUMENTS

| | | | |
|---|---|---|---|
| 2004/0013190 A1* | 1/2004 | Jayaraman et al. | 375/233 |
| 2004/0062307 A1* | 4/2004 | Hallapuro et al. | 375/240.13 |
| 2010/0074323 A1* | 3/2010 | Fu et al. | 375/240.02 |
| 2010/0296587 A1* | 11/2010 | Rusanovskyy et al. | 375/240.29 |
| 2011/0090955 A1* | 4/2011 | Liu et al. | 375/240.03 |

FOREIGN PATENT DOCUMENTS

| | | |
|---|---|---|
| CN | 1529509 A | 9/2004 |
| CN | 1543221 A | 11/2004 |
| CN | 1750659 A | 3/2006 |
| CN | 1933600 A | 3/2007 |
| CN | 101212672 A | 7/2008 |
| CN | 101453644 A | 6/2009 |

OTHER PUBLICATIONS

Vatis, Y.; Edler, B.; Nguyen, D.T.; Ostermann, J.; , "Motion-and aliasing-compensated prediction using a two-dimensional non-separable adaptive Wiener interpolation filter," Image Processing, 2005. ICIP 2005. IEEE International Conference on , vol. 2, no., pp. II-894-7, Sep. 11-14, 2005.*

Sikora, T.; , "Optimal Wiener interpolation filters for multiresolution coding of images," Circuits and Systems for Video Technology, IEEE Transactions on , vol. 7, No. 2, pp. 443-447, Apr. 1997.* ke Thomas Wedi, Adaptive interpolation filters and high-resolution displacements for video coding, IEEE Transactions on Circuits and Systems for Video Technology, vol. 16, No. 4, Apr. 2006.*

Rusanovskyy, D.; Ugur, K.; Gabbouj, M.; Lainema, J.; , "Video coding with pixel-aligned directional adaptive interpolation filters," Circuits and Systems, 2008. ISCAS 2008. IEEE International Symposium on , vol., no., pp. 704-707, May 18-21, 2008.*

International Search Report dated Feb. 12, 2009 in connection with International Patent Application No. PCT/CN2008/073326.

Yu Liu, et al., "Weighted Adaptive Lifting-Based Wavelet Transform", 2007 IEEE, p. 189-192.

Written Opinion of the International Searching Authority dated Feb. 12, 2009 in connection with International Patent Application No. PCT/CN2008/073326.

Partial Translation of Office Action dated May 27, 2010 in connection with Chinese Patent Application No. 200710195919.0.

Office action issued in corresponding Chinese patent application No. 200710195919.0, dated Aug. 9, 2010, and English translation thereof, total 14 pages.

* cited by examiner

IMAGE INTERPOLATION METHOD AND APPARATUS, AND METHOD FOR OBTAINING INTERPOLATION COEFFICIENTS

CROSS-REFERENCE TO RELATED APPLICATIONS

This application is a continuation of International Application No. PCT/CN2008/073326, filed on Dec. 3, 2008, which claims priority to Chinese Patent Application No. 200710195919.0, filed on Dec. 4, 2007, both of which are hereby incorporated by reference in their entireties.

TECHNICAL FIELD

The present invention relates to a communication technology, and in particular, to an image interpolation method and apparatus, and a method for obtaining interpolation coefficients.

BACKGROUND

The motion estimation algorithm and motion compensation algorithm are core algorithms in the video encoding and decoding technology. The principle of motion estimation is as follows: during the encoding, the currently encoded image block is used as the unit, and a proper matching block is searched in a reference image; a residual is obtained by subtracting the pixel value of the matching block from the pixel value of the image block to remove the redundant information of the image; the residual is converted to remove the redundant information once again, and the entropy encoding is performed on the value obtained after the variation coefficient is quantized; the bit data obtained after the entropy encoding is written to a bit stream; the motion offset is also written to the bit stream after undergoing the encoding, where the motion offset is the difference between the position of the matching block in the reference image and the position of the currently encoded image block in the current image. The offset is also called a motion vector. The principle of motion compensation is as follows: during the decoding, the entropy encoding information is retrieved from the bit data in the bit stream and undergoes the entropy encoding; the residual obtained in the motion estimation is obtained after the entropy encoding information undergoes inverse quantization and inverse conversion, and the motion vector is obtained from the bit stream; a corresponding matching block is obtained in the reference image according to the motion vector value, and the pixel value after the current image block is decoded is equal to the sum of the pixel value of the matching block and the pixel value of the reference image in the residual value. Because the residual between the currently encoded image block and the matching block is written to the bit stream, the redundant information of the currently encoded image block is greatly reduced, which compresses the information written to the bit stream and thus improves the encoding efficiency.

During the motion estimation, to find a more accurate matching block in the reference image, the redundant information may be further reduced. The encoder/decoder generally uses search based on the sub-pixel accuracy. Integer pixel points are original pixel points of an original image or an encoded/decoded image. After multiple integer pixel points are processed, the pixel points obtained between the integer pixel points are called sub-pixel points. That is, the sub-pixel points between two integer pixel points may be called one-half sub-pixel points (hereinafter referred to as ½ sub-pixel points), for example, b, h, and j shown in FIG. 1. The sub-pixel points between two ½ sub-pixel points or between an integer pixel point and a ½ sub-pixel point may be called one-quarter sub-pixel points (hereinafter referred to as ¼ sub-pixel points), for example, a c, d, l, f, n, I, k, e, g, m, and o shown in FIG. 1. The process of obtaining sub-pixel points may be called an interpolation filter process. The search based on the sub-pixel accuracy may obtain a better image matching block, which may reduce the redundant information of the currently encoded image block and improve the encoding efficiency. Thus, the interpolation filter of pixel points determines the effect of the search based on the sub-pixel accuracy. In addition, in the interpolation filter of high-accuracy pixel points, the complexity of the interpolation method is also an important factor in the current video encoding and decoding technology.

Standards related to the video encoding and decoding technology provide interpolation methods based on ¼ sub-pixels, for example, ¼ sub-pixel interpolation in the following solution 1 and adaptive ¼ sub-pixel interpolation in the following solutions 2 and 3.

In the current video compression encoding standards such as H.264/AVC and AVS, interpolation methods based on the ½ sub-pixel accuracy and ¼ sub-pixel accuracy are generally used. The interpolation methods and interpolation coefficients used in the interpolations are fixed. That is, all the image blocks in an image have the same interpolation methods based on the sub-pixel accuracy; and the ½ sub-pixel points and ¼ sub-pixel points at the same position in the image blocks have the same interpolation methods and interpolation coefficients. The following are examples.

Solution 1: As shown in FIG. 1, C3, C4, D3, and D4 are integer pixel points; b, h, and j are ½ sub-pixel points to be interpolated between these four integer pixel points; a, c, d, l, f, n, I, k, e, g, m, and o are ¼ sub-pixel points to be interpolated between these four integer pixel points. The following describes specific interpolation methods for the preceding sub-pixel points.

The interpolations of the ½ sub-pixel points areas follows:

$b = (C1 - 5 \times C2 + 2 \times C3 + 2 \times C4 - 5 \times C5 + C6)/32;$ $h = (A3 - 5 \times B3 + 2 \times C3 + 2 \times D3 - 5 \times E3 + F3)/32;$ $j = (b_A - 5 \times b_B + 20 \times b + 20 \times b_D - 5 \times b_E + b_F)/32;$ $b_A$ indicates the ½ sub-pixel point between A3 and A4; $b_B$ indicates the ½ sub-pixel point between B3 and B4; the rest may be deduced in the same way.

The interpolations of the ¼ sub-pixel points are as follows:
a=(C3+b)/2; c=(b+C4)/2; d=(C3+h)/2; 1=(h+D3)/2;
f=(b+j)/2; n=(j+$b_D$)/2; i=(h+j)/2; k=(H4+j)/2;
e=(b+h)/2; g=(b+H4)/2; m=(h+$b_D$)/2; o=($b_D$+H4)/2;
H4 indicates the ½ sub-pixel point between C4 and D4.

The following describes specific interpolation methods of the sub-pixel points in the AVS standard, as shown in FIG. 1.

The interpolations of the ½ sub-pixel points are as follows:

$b = (-C2 + 5C3 + 5C4 - C5)/8;$ $h = (-B3 + 5C3 + 5D3 - E3)/8;$ $j = (-bB + 5b + 5bD - bE)/8;$

The interpolations of the ¼ sub-pixel points are as follows:

$a = (-C1 - 2C2 + 96C3 + 42C4 - 7C5)/128;$ $c = (-7C2 + 42C3 + 96C4 - 2C5 - C6)/128;$ $i = (-H1 - 2H2 + 96h + 42H4 - 7H5)/128;$ $k = (-7H2 + 42h + 96H4 - 2H5 - H6)/128;$

H1 indicates the ½ sub-pixel point between C1 and D1; H2 indicates the ½ sub-pixel point between C2 and D2; the rest may be deduced in the same way.

$$d=(-C1-2C2+96C3+42C4-7C5)/128;$$

$$l=(-7C2+42C3+96C4-2C5-C6)/128;$$

$$f=(-b_A-2b_B+96b_D+42b_D-7b_E)/128;$$

$$n=(-7b_B-42b+96b_D-2b_E-b_F)/128;$$

$b_A$ indicates the ½ sub-pixel point between A3 and A4; $b_B$ indicates the ½ sub-pixel point between B3 and B4; the rest may be deduced in the same way.

e=(C3+j)/2; o=(D4+j)/2;

g=(C4+j)/2; m=(D3+j)/2;

In the current sub-pixel interpolation algorithm, the interpolation coefficients are fixed. As a result, the interpolation method cannot be adapted to the change of the image texture and structure information. In the H.264/AVC standard, only weighted averaging is performed on two adjacent points of the ¼ sub-pixel points, which greatly reduces the interpolation accuracy. In the AVS standard, only weighted averaging is performed on two neighbor points of e, g, m, and o, which greatly reduces the interpolation accuracy. Thus, the search accuracy of sub-pixel points is not high.

Solution 2: In the current VCEG standard, a frame-level adaptive two-dimensional interpolation filter method is available. Details are as follows:

$$a = [C1 \cdot h_{1a} + C2 \cdot h_{2a} + C3 \cdot h_{3a} + C4 \cdot h_{4a} + C5 \cdot h_{5a} + C6 \cdot h_{6a} + 2^9] \gg 10$$

$$b = [(C1 + C6) \cdot h_{1b} + (C2 + C5) \cdot h_{2b} + (C3 + C4) \cdot h_{3b} + 2^9] \gg 10$$

$$c = [C1 \cdot h_{1c} + C2 \cdot h_{2c} + C3 \cdot h_{3c} + C4 \cdot h_{4c} + C5 \cdot h_{5c} + C6 \cdot h_{6c} + 2^9] \gg 10$$

$$d = [A3 \cdot h_{1d} + B3 \cdot h_{2d} + C3 \cdot h_{3d} + D3 \cdot h_{4d} + E3 \cdot h_{5d} + F3 \cdot h_{6d} + 2^9] \gg 10$$

$$l = [A3 \cdot h_{1l} + B3 \cdot h_{2l} + C3 \cdot h_{3l} + D3 \cdot h_{4l} + E3 \cdot h_{5l} + F3 \cdot h_{6l} + 2^9] \gg 10$$

$$h = [(A3 + F3) \cdot h_{1h} + (B3 + E3) \cdot h_{2h} + (C3 + D3) \cdot h_{3h} + 2^9] \gg 10$$

$$f = \begin{bmatrix} (A1 + A6) \cdot h_{11f} + (A2 + A5) \cdot h_{12f} + \\ (A3 + A4) \cdot h_{13f} + (B1 + B6) \cdot h_{21f} + \\ (B2 + B5) \cdot h_{22f} + (B3 + B4) \cdot h_{23f} + \\ (C1 + C6) \cdot h_{31f} + (C2 + C5) \cdot h_{32f} + \\ (C3 + C4) \cdot h_{33f} + (D1 + D6) \cdot h_{41f} + \\ (D2 + D5) \cdot h_{42f} + (D3 + D4) \cdot h_{43f} + \\ (E1 + E6) \cdot h_{51f} + (E2 + E5) \cdot h_{52f} + \\ (E3 + E4) \cdot h_{53f} + (F1 + F6) \cdot h_{61f} + \\ (F2 + F5) \cdot h_{62f} + (F3 + F4) \cdot h_{63f} + 2^9 \end{bmatrix} \gg 10,$$

-continued $$n = \begin{bmatrix} (A1 + A6) \cdot h_{11n} + (A2 + A5) \cdot h_{12n} + \\ (A3 + A4) \cdot h_{13n} + (B1 + B6) \cdot h_{21n} + \\ (B2 + B5) \cdot h_{22n} + (B3 + B4) \cdot h_{23n} + \\ (C1 + C6) \cdot h_{31n} + (C2 + C5) \cdot h_{32n} + \\ (C3 + C4) \cdot h_{33n} + (D1 + D6) \cdot h_{41n} + \\ (D2 + D5) \cdot h_{42n} + (D3 + D4) \cdot h_{43n} + \\ (E1 + E6) \cdot h_{51n} + (E2 + E5) \cdot h_{52n} + \\ (E3 + E4) \cdot h_{53n} + (F1 + F6) \cdot h_{61n} + \\ (F2 + F5) \cdot h_{62n} + (F3 + F4) \cdot h_{63n} + 2^9 \end{bmatrix} \gg 10,$$

$$i = \begin{bmatrix} (A1 + F1) \cdot h_{11i} + (A2 + F2) \cdot h_{12i} + \\ (A3 + F3) \cdot h_{13i} + (B1 + E1) \cdot h_{21i} + \\ (B2 + E2) \cdot h_{22i} + (B3 + E3) \cdot h_{23i} + \\ (C1 + D1) \cdot h_{31i} + (C2 + D2) \cdot h_{32i} + \\ (C3 + D3) \cdot h_{33i} + (C6 + D6) \cdot h_{41i} + \\ (C5 + D5) \cdot h_{42i} + (C4 + D4) \cdot h_{43i} + \\ (B6 + E6) \cdot h_{51i} + (B5 + E5) \cdot h_{52i} + \\ (B4 + E4) \cdot h_{53i} + (A6 + F6) \cdot h_{61i} + \\ (A5 + F5) \cdot h_{62i} + (A4 + F4) \cdot h_{63i} + 2^9 \end{bmatrix} \gg 10,$$

$$k = \begin{bmatrix} (A1 + F1) \cdot h_{11k} + (A2 + F2) \cdot h_{12k} + \\ (A3 + F3) \cdot h_{13k} + (B1 + E1) \cdot h_{21k} + \\ (B2 + E2) \cdot h_{22k} + (B3 + E3) \cdot h_{23k} + \\ (C1 + D1) \cdot h_{31k} + (C2 + D2) \cdot h_{32k} + \\ (C3 + D3) \cdot h_{33k} + (C6 + D6) \cdot h_{41k} + \\ (C5 + D5) \cdot h_{42k} + (C4 + D4) \cdot h_{43k} + \\ (B6 + E6) \cdot h_{51k} + (B5 + E5) \cdot h_{52k} + \\ (B4 + E4) \cdot h_{53k} + (A6 + F6) \cdot h_{61k} + \\ (A5 + F5) \cdot h_{62k} + (A4 + F4) \cdot h_{63k} + 2^9 \end{bmatrix} \gg 10,$$

$$j = \begin{bmatrix} (A1 + A6 + F1 + F6) \cdot h_{11} + \\ (A2 + A5 + B1 + B6 + E1 + E6 + F2 + F5) \cdot h_{12} + \\ (A3 + A4 + C1 + C6 + D1 + D6 + F3 + F4) \cdot h_{13} + \\ (B2 + B5 + E2 + E5) \cdot h_{22} + \\ (B3 + B4 + C2 + C5 + D2 + D5 + E3 + E4) \cdot h_{23} + \\ (C3 + C4 + D3 + D4) \cdot h_{33} + 2^9 \end{bmatrix} \gg 10,$$

$$e = \begin{bmatrix} A1 \cdot h_{11e} + (A2 + B1) \cdot h_{12e} + \\ (A3 + C1) \cdot h_{13e} + (A4 + D1) \cdot h_{14e} + \\ (A5 + E1) \cdot h_{15e} + (A6 + F1) \cdot h_{16e} + \\ B2 \cdot h_{22e} + (B3 + C2) \cdot h_{23e} + \\ (B4 + D2) \cdot h_{24e} + (B5 + E2) \cdot h_{25e} + \\ (B6 + F2) \cdot h_{26e} + C3 \cdot h_{33e} + \\ (C4 + D3) \cdot h_{34e} + (C5 + E3) \cdot h_{35e} + \\ (C6 + F3) \cdot h_{36e} + D4 \cdot h_{44e} + \\ (D5 + E4) \cdot h_{45e} + (D6 + F4) \cdot h_{46e} + \\ E5 \cdot h_{55e} + (E6 + F5) \cdot h_{56e} + F6 \cdot h_{66e} + 2^9 \end{bmatrix} \gg 10,$$

-continued $$o = \begin{bmatrix} A1 \cdot h_{11o} + (A2+B1) \cdot h_{12o} + \\ (A3+C1) \cdot h_{13o} + (A4+D1) \cdot h_{14o} + \\ (A5+E1) \cdot h_{15o} + (A6+F1) \cdot h_{16o} + \\ B2 \cdot h_{22o} + (B3+C2) \cdot h_{23o} + \\ (B4+D2) \cdot h_{24o} + (B5+E2) \cdot h_{25o} + \\ (B6+F2) \cdot h_{26o} + C3 \cdot h_{33o} + \\ (C4+D3) \cdot h_{34o} + (C5+E3) \cdot h_{35o} + \\ (C6+F3) \cdot h_{36o} + D4 \cdot h_{44o} + \\ (D5+E4) \cdot h_{45o} + (D6+F4) \cdot h_{46o} + \\ E5 \cdot h_{55o} + (E6+F5) \cdot h_{56o} + F6 \cdot h_{66o} + 2^9 \end{bmatrix} >> 10,$$

$$g = \begin{bmatrix} A6 \cdot h_{11g} + (A5+B6) \cdot h_{12g} + \\ (A4+C6) \cdot h_{13g} + (A3+D6) \cdot h_{14g} + \\ (A2+E6) \cdot h_{15g} + (A1+F6) \cdot h_{16g} + \\ B5 \cdot h_{22g} + (B4+C5) \cdot h_{23g} + \\ (B3+D5) \cdot h_{24g} + (B2+E5) \cdot h_{25g} + \\ (B1+F5) \cdot h_{26g} + C4 \cdot h_{33g} + \\ (C3+D4) \cdot h_{34g} + (C2+E4) \cdot h_{35g} + \\ (C1+F4) \cdot h_{36g} + D3 \cdot h_{44g} + \\ (D2+E3) \cdot h_{45g} + (D1+F3) \cdot h_{46g} + \\ E2 \cdot h_{55g} + (E1+F2) \cdot h_{56g} + F1 \cdot h_{66g} + 2^9 \end{bmatrix} >> 10,$$

$$m = \begin{bmatrix} A6 \cdot h_{11m} + (A5+B6) \cdot h_{12m} + \\ (A4+C6) \cdot h_{13m} + (A3+D6) \cdot h_{14m} + \\ (A2+E6) \cdot h_{15m} + (A1+F6) \cdot h_{16m} + \\ B5 \cdot h_{22m} + (B4+C5) \cdot h_{23m} + \\ (B3+D5) \cdot h_{24m} + (B2+E5) \cdot h_{25m} + \\ (B1+F5) \cdot h_{26m} + C4 \cdot h_{33m} + \\ (C3+D4) \cdot h_{34m} + (C2+E4) \cdot h_{35m} + \\ (C1+F4) \cdot h_{36m} + D3 \cdot h_{44m} + (D2+E3) \cdot h_{45m} + \\ (D1+F3) \cdot h_{46m} + E2 \cdot h_{55m} + \\ (E1+F2) \cdot h_{56m} + F1 \cdot h_{66m} + 2^9 \end{bmatrix} >> 10,$$

$h_{xyz}$ indicates the interpolation coefficient needed by each point during the interpolation.

For this two-dimensional interpolation filter, all the sub-pixel points are obtained by performing linear weighting on the integer pixel points. a, b, c, d, h, and l adopt the one-dimensional interpolation filter method. Other points undergo the interpolation filter by using 36 integer pixel points in the two-dimensional space.

The two-dimensional interpolation filter greatly increases the complexity of the encoder and the decoder. In addition, when small-size images are encoded, a lot of integer pixel point information is also needed. Thus, there is a lot of interpolation coefficient information to be transmitted in the bit stream, increasing the burden of the bit stream and reducing the efficiency of transmitting the interpolation coefficients by the bit stream.

Solution 3: In the current VCEG solution, a frame-level adaptive one-dimensional interpolation filter method is available. This method simplifies the interpolation operation on the basis of the preceding two-dimensional interpolation filter. In this method, the interpolation is performed with several one-dimensional horizontal and one-dimensional vertical integer pixel points only. Details are as follows:

$a = [C1 \cdot h_{1a} + C2 \cdot h_{2a} + C3 \cdot h_{3a} + C4 \cdot h_{4a} + C5 \cdot h_{5a} + C6 \cdot h_{6a} + 2^7] >> 8$ $b = [(C1+C6) \cdot h_{1b} + (C2+C5) \cdot h_{2b} + (C3+C4) \cdot h_{3b} + 2^7] >> 8$ $c = [C1 \cdot h_{1c} + C2 \cdot h_{2c} + C3 \cdot h_{3c} + C4 \cdot h_{4c} + C5 \cdot h_{5c} + C6 \cdot h_{6c} + 2^7] >> 8$ $h = [(A3+F3) \cdot h_{1h} + (B3+E3) \cdot h_{2h} + (C3+D3) \cdot h_{3h} + 2^7] >> 8$ $j = [(b_A+b_F) \cdot h_{1j} + (b_B+b_E) \cdot h_{2j} + (b_C+b_D) \cdot h_{3j} + 2^7] >> 8$ $d = [A3 \cdot h_{1d} + B3 \cdot h_{2d} + C3 \cdot h_{3d} + D3 \cdot h_{4d} + E3 \cdot h_{5d} + F3 \cdot h_{6d} + 2^7] >> 8$ $l = [A3 \cdot h_{1l} + B3 \cdot h_{2l} + C3 \cdot h_{3l} + D3 \cdot h_{4l} + E3 \cdot h_{5l} + F3 \cdot h_{6l} + 2^7] >> 8$ $i = [(a_A+a_F) \cdot h_{1i} + (a_B+a_E) \cdot h_{2i} + (a_C+a_D) \cdot h_{3i} + 2^7] >> 8$ $k = [(c_A+c_B) \cdot h_{1k} + (c_B+c_E) \cdot h_{2k} + (c_C+c_D) \cdot h_{3k} + 2^7] >> 8$ $f = [b_A \cdot h_{1f} + b_B \cdot h_{2f} + b_C \cdot h_{3f} + b_D \cdot h_{4f} + b_E \cdot h_{5f} + b_F \cdot h_{6f} + 2^7] >> 8$ $n = [b_A \cdot h_{1n} + b_B \cdot h_{2n} + b_C \cdot h_{3n} + b_D \cdot h_{4n} + b_E \cdot h_{5n} + b_F \cdot h_{6n} + 2^7] >> 8$ $e = [(a_A \cdot h_{1e} + a_B \cdot h_{2e} + a_C \cdot h_{3e} + a_D \cdot h_{4e} + a_E \cdot h_{5e} + a_F \cdot h_{6e} + 2^7] >> 8$ $m = [(a_A \cdot h_{1m} + a_B \cdot h_{2m} + a_C \cdot h_{3m} + a_D \cdot h_{4m} + a_E \cdot h_{5m} + a_F \cdot h_{6m} + 2^7] >> 8$ $g = [(c_A \cdot h_{1g} + c_B \cdot h_{2g} + c_C \cdot h_{3g} + c_D \cdot h_{4g} + c_E \cdot h_{5g} + c_F \cdot h_{6g} + 2^7] >> 8$ $o = [(c_A \cdot h_{1o} + c_B \cdot h_{2o} + c_C \cdot h_{3o} + c_D \cdot h_{4o} + c_E \cdot h_{5o} + c_F \cdot h_{6o} + 2^7] >> 8$ $h_{xy}$ indicates the interpolation coefficient needed by each point during the interpolation.

Compared with the preceding two-dimensional interpolation filter, the one-dimensional interpolation filter simplifies the interpolation operation. This interpolation method, however, cannot be fully compatible with the prior art (H.264). In this method, some integer pixel points or sub-pixel points need to be extended to perform the interpolation operation. In addition, sub-pixel points a, b, and c undergo a one-dimensional interpolation by using the horizontal pixel information, while sub-pixel points d, e, f, g, h, I, j, k, l, m, n, and o undergo a one-dimensional interpolation by using the vertical pixel information. In this separable one-dimensional interpolation filter method, too many vertical pixel points of the image are used. This may reduce the encoding efficiency when the texture information of the vertical pixels of the image changes frequently.

SUMMARY

Embodiments of the present invention provide an image interpolation method and apparatus and a method for obtaining interpolation coefficients to obtain pixel points in the vertical direction, horizontal direction or any other directions and perform interpolation filter on these pixel points, thus increasing the interpolation filter accuracy of the pixel points, improving the search accuracy of the pixel points, and obtaining more accurate matching block information in a reference image.

An image interpolation method is provided in an embodiment of the present invention. The pixel points are arranged in a two-dimensional matrix composed of rows in the horizontal direction and columns in the vertical direction. The method includes:

obtaining pixel values of integer pixel points and/or sub-pixel points in a row, a column or in any other directions of the pixel points, where the sub-pixel points are pixel points between the adjacent integer pixel points;

obtaining pre-calculated interpolation coefficients corresponding to the integer pixel points and/or sub-pixel points in the row, column or in any other directions of the pixel points; and interpolating the pixel points according to the obtained pixel values of the integer pixel points and/or sub-pixel points and corresponding interpolation coefficients.

A method for obtaining image interpolation coefficients includes:

constructing a Wiener-Hopf equation by using pixel points to be interpolated and the integer pixel points and/or sub-pixel points in a row, a column or in any other directions of the pixel points;

solving the Wiener-Hopf equation, and obtaining the interpolation coefficients corresponding to the integer pixel points and/or sub-pixel points in the row, column or in any other directions of the pixel points; and obtaining the interpolation coefficients corresponding to the integer pixel points and/or sub-pixel points.

An image interpolation apparatus includes:

a first obtaining module, adapted to obtain pixel values of integer pixel points and/or sub-pixel points in a row, a column or in any other directions of pixel points, where the sub-pixel points are pixel points between the adjacent integer pixel points;

a second obtaining module, adapted to obtain pre-calculated interpolation coefficients corresponding to the integer pixel points and/or sub-pixel points in the row, column or in any other directions of the pixel points; and a first calculating module, adapted to interpolate the pixel points according to the obtained pixel values of the integer pixel points and/or sub-pixel points and corresponding interpolation coefficients.

According to the preceding technical solution of the present invention, by using the image interpolation method and apparatus, and the method for obtaining interpolation coefficients, each sub-pixel point is interpolated according to the obtained pixel values of the pixel points in different directions and corresponding interpolation coefficients. This can improve the interpolation filter effect and increase the search accuracy of the pixel points. In addition, the interpolation information of low-accuracy pixel points is fully used for the interpolations of high-accuracy pixel points. This may increase the calculation accuracy, improve the interpolation filter effect, and be compatible with the current video encoding and decoding technology.

BRIEF DESCRIPTION OF THE DRAWINGS

To make the technical solution under the present invention or in the prior art clearer, the accompanying drawings for illustrating the embodiments of the present invention or illustrating the prior art are outlined below. Evidently, the accompanying drawings are exemplary only, and those skilled in the art can derive other drawings from such accompanying drawings without creative work.

FIG. 1 illustrates interpolations of sub-pixel points between pixel points;

DETAILED DESCRIPTION

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain based on embodiments of the present invention also fall within the scope of protection of the present invention.

The technical solution provided in embodiments of the present invention is a one-dimensional interpolation filter technology, in which different directions are selected for pixel points at different positions. The different directions recited in this invention include the horizontal direction, vertical direction, and any other directions. This one-dimensional interpolation filter technology mixing different directions has a better interpolation filter effect on the video image with different texture information. This image interpolation method may be applied in scenarios where the encoder interpolates the pixel points in the reference image and the decoder interpolates the pixel points in the reference image.

Figure 2:
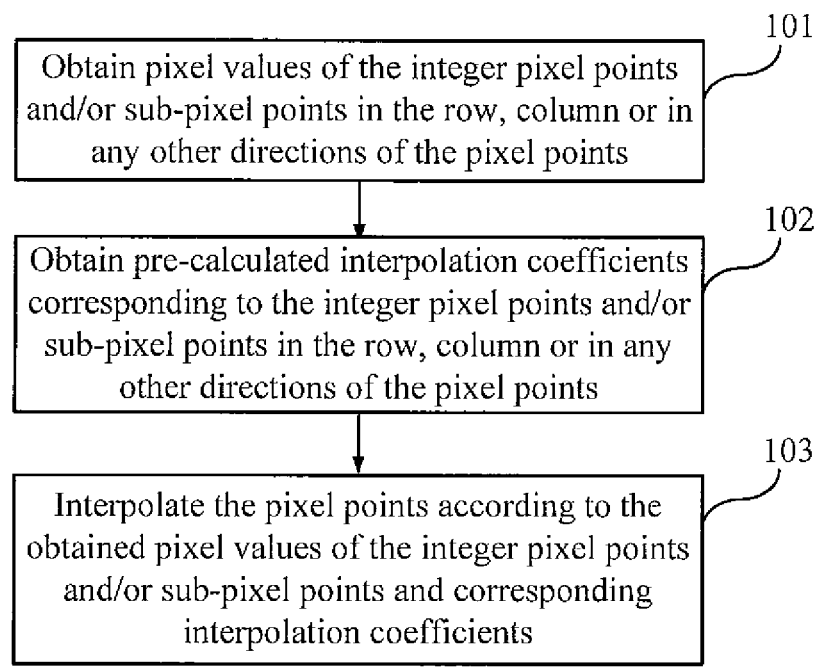
FIG. 2 is a flowchart of a first embodiment of an image interpolation method according to the present invention.

FIG. 2 is a flowchart of the first embodiment of the image interpolation method according to the present invention. The method includes the following steps:

Step 101: Obtain pixel values of the integer pixel points and/or sub-pixel points in the row, column or in any other directions of the pixel points.

Step 102: Obtain pre-calculated interpolation coefficients corresponding to the integer pixel points and/or sub-pixel points in the row, column or in any other directions of the pixel points.

Step 103: Interpolate the pixel points according to the obtained pixel values of the integer pixel points and/or sub-pixel points and corresponding interpolation coefficients.

The pixel points that need to be interpolated may be integer pixel points and sub-pixel points.

In this embodiment, the pixel points in any other directions are the pixel points that are proximately located on the same straight line as the sub-pixel points, which include integer pixel points and sub-pixel points. Only the pixel values of the integer pixel points or the pixel values of the sub-pixel points may be used, or the pixel values of both the integer pixel points and the sub-pixel points may be used. After the pixel values of these pixel points are obtained, the one-dimensional interpolation filter technology may be used to interpolate the sub-pixel points. The sub-pixel points to be interpolated always have a higher accuracy than the integer pixel points and/or sub-pixel points to be used or have the same accuracy as the sub-pixel points to be used. The sub-pixel points may be $\frac{1}{2}$, $\frac{1}{4}$, $\frac{1}{8}$ or $\frac{1}{16}$ sub-pixel points or more accurate sub-pixel points.

In this embodiment, pixel values of pixel points in different directions are used during the interpolation calculation of sub-pixel points, and the distribution of textures in the two-dimensional space is fully considered. Thus, a higher encoding efficiency may be achieved, and the obtained pixel values of the integer pixel points and/or sub-pixel points may be compatible with the prior art.

Figure 3:
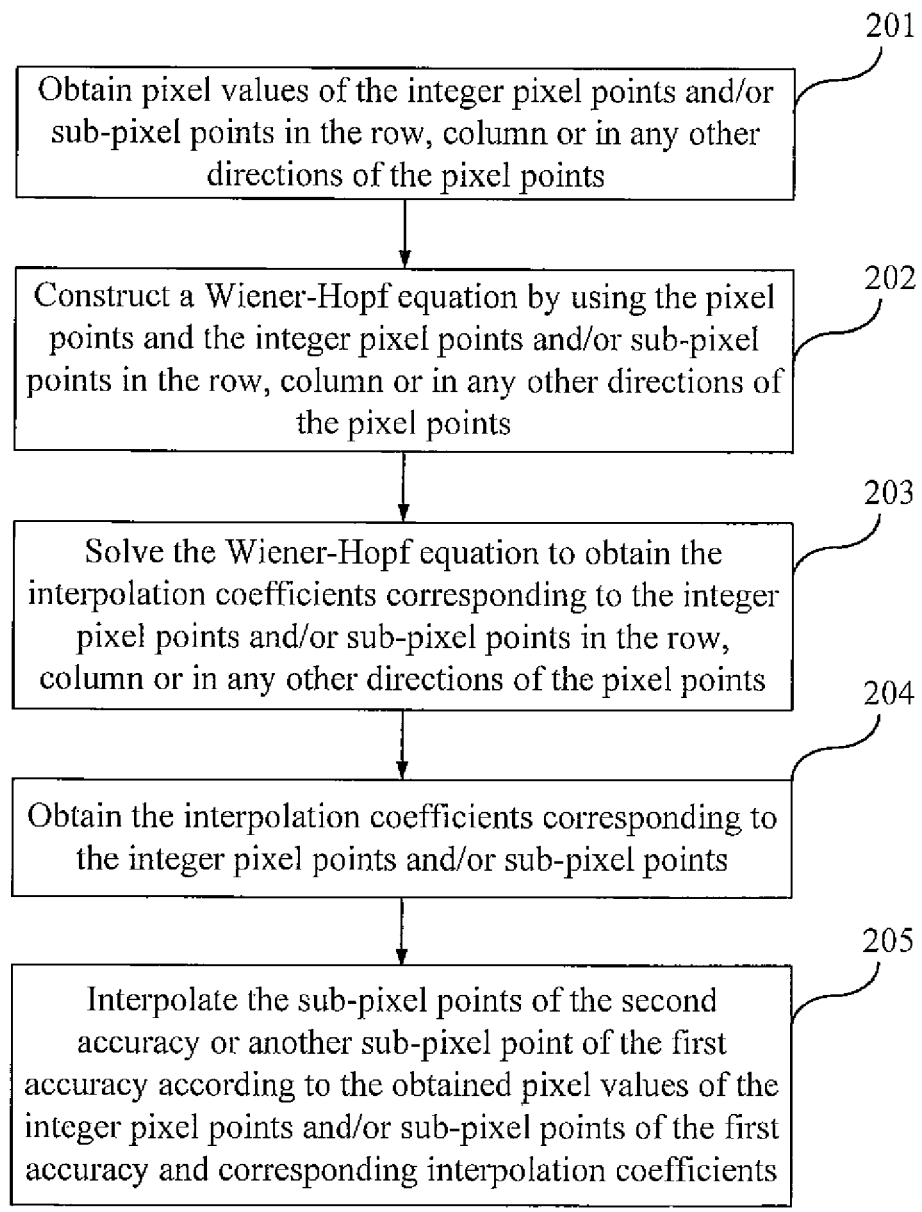
FIG. 3 is a flowchart of a second embodiment of the image interpolation method according to the present invention.

FIG. 3 is a flowchart of the second embodiment of the image interpolation method according to the present invention. The method includes the following steps:

Step 201: Obtain pixel values of the integer pixel points and/or sub-pixel points in the row, column or in any other directions of the pixel points.

Step 202: Construct a one-dimensional Wiener-Hopf equation by using the pixel points and the integer pixel points and/or sub-pixel points in the row, column or in any other directions of the pixel points.

Step 203: Solve the Wiener-Hopf equation to obtain the interpolation coefficients corresponding to the integer pixel points and/or sub-pixel points in the row, column or in any other directions of the pixel points.

Step 204: Obtain the interpolation coefficients corresponding to the integer pixel points and/or sub-pixel points.

Step 205: Interpolate the sub-pixel points of the second accuracy or another sub-pixel point of the first accuracy according to the obtained pixel values of the integer pixel points and/or sub-pixel points of the first accuracy and corresponding interpolation coefficients.

The accuracy in step 205 is the accuracy for dividing sub-pixel points between adjacent integer pixel points. The shorter the distance between the divided sub-pixel point and its neighbor integer pixel point is, the higher the accuracy is. For example, the ¼ sub-pixel points have a higher accuracy than the ½ sub-pixel points; the ⅛ sub-pixel points have a higher accuracy than the 1/16 sub-pixel points. In this embodiment, the first accuracy may be a ½ sub-pixel point, and the second accuracy may be a ¼ sub-pixel point.

For example, the integer pixel points and/or sub-pixel points in the horizontal direction, vertical direction, the direction of positive 45 degrees and the direction of negative 45 degrees must be used to interpolate the required pixel points. The following describes specific interpolation formulas by using the integer pixel points and/or sub-pixel points in each direction.

Horizontal direction: A first sub-pixel point is interpolated according to the obtained pixel values of M integer pixel points and/or sub-pixel points of the first accuracy and interpolation coefficients corresponding to the M integer pixel points and/or sub-pixel points of the first accuracy, where the first sub-pixel point is located in the same row as the M pixel points and/or the sub-pixel points, and has a higher accuracy than the M integer pixel points and/or the sub-pixel points of the first accuracy or has the same accuracy as the sub-pixel points of the first accuracy, where the interpolation formula is:

$$a = A_1 \cdot h_{1a} + A_2 \cdot h_{2a} + A_3 \cdot h_{3a} + \ldots + A_M \cdot h_{Ma}$$

In this formula, a indicates the interpolation of the first sub-pixel point; $A_1, A_2, \ldots, A_M$ indicate the pixel values of the integer pixel points and/or sub-pixel points that are located in the same row as a; $h_{1a}, h_{2a}, \ldots, h_{Ma}$ indicate interpolation coefficients corresponding to each integer pixel point and/or each sub-pixel point; and M is a positive integer.

Fixed interpolation coefficients and pixel values of pixel points corresponding to the fixed interpolation coefficients are used for interpolation calculation to obtain the pixel values $A_1, A_2, \ldots, A_M$. For example, the pixel point corresponding to $A_2$ is a sub-pixel point that has a lower accuracy than the first sub-pixel point corresponding to a. That is, if a is a ¼ sub-pixel point, $A_2$ is a ½ sub-pixel point. Because $A_2$ is also a sub-pixel point, the pixel value of A2 also needs to be calculated with the interpolation method. However, if the calculation on the adaptive interpolation coefficients of $A_2$ is performed first and the calculation on the adaptive interpolation coefficients of a is performed accordingly, the encoding and decoding process becomes more complex. Thus, the following formula may be used to simplify the encoding and decoding process. For example, to calculate a sub-pixel point with a lower accuracy, this point may be interpolated by using a preset fixed interpolation coefficient. The fixed interpolation coefficient is a fixed value or remains unchanged within at least a period of time. Then, a is interpolated by using the calculated $A_2$ and other pixel points. In this case, the interpolation coefficient needed by a may be an adaptive interpolation coefficient.

Vertical direction: A second sub-pixel point is interpolated according to the obtained pixel values of N integer pixel points and/or the sub-pixel points of the first accuracy and interpolation coefficients corresponding to the N integer pixel points and/or the sub-pixel points of the first accuracy, where the second sub-pixel point is located in the same column as the N pixel points and/or the sub-pixel points, and has a higher accuracy than the N integer pixel points and/or the sub-pixel points of the first accuracy or has the same accuracy as the sub-pixel points of the first accuracy, where the interpolation formula is:

$$b = B_1 \cdot h_{1b} + B_2 \cdot h_{2b} + B_3 \cdot h_{3b} + \ldots + B_N \cdot h_{Nb}$$

In this formula, b indicates the interpolation of the second sub-pixel point; $B_1, B_2, \ldots, B_N$ indicate the pixel values of the integer pixel points and/or sub-pixel points that are located in the same column as b; $h_{1b}, h_{2b}, \ldots, h_{Nb}$ indicate interpolation coefficients corresponding to each integer pixel point and/or each sub-pixel point; and N is a positive integer.

Fixed interpolation coefficients and pixel values of pixel points corresponding to the fixed interpolation coefficients are used for interpolation calculation to obtain the pixel values $B_1, B_2, \ldots, B_N$.

Direction of positive 45 degrees: A third sub-pixel point is interpolated according to the obtained pixel values of I integer pixel points and/or the sub-pixel points of the first accuracy and interpolation coefficients corresponding to the I integer pixel points and/or the sub-pixel points of the first accuracy, where the third sub-pixel point is located in the same direction of positive 45 degrees as the I pixel points and/or the sub-pixel points, and has a higher accuracy than the I integer pixel points and/or the sub-pixel points of the first accuracy or has the same accuracy as the sub-pixel points of the first accuracy, where the interpolation formula is:

$$c = C_1 \cdot h_{1c} + C_2 \cdot h_{2c} + C_3 \cdot h_{3c} + \ldots + C_I \cdot h_{Ic}$$

In this formula, c indicates the interpolation of the third sub-pixel point; $C_1, C_2, \ldots, C_I$ indicate the pixel values of the integer pixel points and/or the sub-pixel point that are located in the same direction of positive 45 degrees as c; $h_{1c}, h_{2c}, \ldots, h_{Ic}$ indicate interpolation coefficients corresponding to each integer pixel point and/or sub-pixel point; and I is a positive integer.

Fixed interpolation coefficients and pixel values of pixel points corresponding to the fixed interpolation coefficients are used for interpolation calculation to obtain the pixel values $C_1, C_2, \ldots, C_I$.

Direction of negative 45 degrees: A fourth sub-pixel point is interpolated according to the obtained pixel values of K integer pixel points and/or the sub-pixel points of the first accuracy and interpolation coefficients corresponding to the K integer pixel points and/or the sub-pixel points of the first accuracy, where the fourth sub-pixel point is located in the same direction of negative 45 degrees as the K pixel points and/or the sub-pixel points, and has a higher accuracy than the K integer pixel points and/or the sub-pixel points of the first accuracy or has the same accuracy as the sub-pixel points of the first accuracy, where the interpolation formula is:

$$d = D_1 \cdot h_{1d} + D_2 \cdot h_{2d} + D_3 \cdot h_{3d} + \ldots + D_K \cdot h_{Kd}$$

In this formula, d indicates the interpolation of the third sub-pixel point; $D_1, D_2, \ldots, D_K$ indicate the pixel values of the integer pixel points and/or the sub-pixel point that are located in the same direction of negative 45 degrees as d; $h_{1d}, h_{2d}, \ldots, h_{Kd}$ indicate interpolation coefficients corresponding to each integer pixel point and/or sub-pixel point; and K is a positive integer.

Fixed interpolation coefficients and pixel values of pixel points corresponding to the fixed interpolation coefficients are used for interpolation calculation to obtain the pixel values $D_1, D_2, \ldots, D_K$.

The following describes how to calculate interpolation coefficients corresponding to the integer pixel points and/or sub-pixel points in the row, column or in any other directions of the required pixel points.

A one-dimensional Wiener-Hopf equation is constructed by using the required pixel points and a pixel point in a direction.

The following equation is constructed in the horizontal direction:

$$e^2 = \sum_{x,y} \left( S_{x,y} - \sum_i h_i \cdot P_{\tilde{x}+i,y} \right)^2$$

In this equation, S indicates the original image that is being encoded, that is, the image to be used during the interpolation of pixel points in the reference image. $S_{x,y}$ indicates a pixel point in the original image that is being encoded. P indicates the corresponding reference image. In the preceding equation, $\tilde{x} = x + MV_x - \text{FilterOffset}$, where $MV_x$ indicates the horizontal motion vector of a (x, y) pixel point; FilterOffset indicates half the length of the filter; $h_i$ indicates the horizontal interpolation coefficient.

To obtain the optimal interpolation filter coefficient, $e^2$ should be the smallest, and the following formula must be met:

$$0 = \frac{(\partial e^2)}{\partial h_i}$$
$$= \frac{\partial}{\partial h_i} \left( \sum_x \sum_y \left( S_{x,y} - \sum_i h_i P_{\tilde{x}+i,y} \right)^2 \right)$$
$$= \sum_x \sum_y \left( S_{x,y} - \sum_i h_i P_{\tilde{x}+i,y} \right) P_{\tilde{x}+k,y}$$

If $\forall i \in \{0; 5\}$, the one-dimensional Wiener-Hopf equation may be as follows:

$$\sum_x \sum_y S_{x,y} P_{\tilde{x}+k,y} = \sum_x \sum_y \sum_i h_i P_{\tilde{x}+i,y} P_{\tilde{x}+k,y}$$

The interpolation coefficient $h_i$ corresponding to the pixel point in the original image in the horizontal direction may be obtained by solving this 6×6 two-dimensional equation.

Similarly, the Wiener-Hopf equation in the vertical direction is as follows:

$$e^2 = \sum_{x,y} \left( S_{x,y} - \sum_i h_i \cdot P_{x,\tilde{y}+i} \right)^2$$

Then, the one-dimensional Wiener-Hopf equation may be as follows:

$$\sum_x \sum_y S_{x,y} P_{x,\tilde{y}+k} = \sum_x \sum_y \sum_i h_i P_{x,\tilde{y}+i} P_{x,\tilde{y}+k}$$

In this equation, $\tilde{y} = y + MV_y - \text{FilterOffset}$, where $MV_y$ indicates the vertical motion vector of a (x, y) pixel point; FilterOffset indicates half the length of the filter; $h_i$ indicates the vertical interpolation coefficient.

The interpolation filter coefficient $h_i$ in the vertical direction may be obtained by solving this 6×6 two-dimensional equation.

The Wiener-Hopf equation in the direction of negative 45 degrees is as follows:

$$\sum_x \sum_y S_{x,y} P_{\tilde{x}+l(i),\tilde{y}+k(i)} = \sum_x \sum_y \sum_i h_i P_{\tilde{x}+n(i),\tilde{y}+m(i)} P_{\tilde{x}+l(i),\tilde{y}+k(i)}$$

In this equation, l(i), k(i), m(i), n(i) depend on the positions of surrounding pixels used by i and interpolation at 45 degrees.

The interpolation filter coefficient $h_i$ in the directions of positive and negative 45 degrees may be obtained by solving this 6×6 two-dimensional equation.

The following describes the method for calculating the interpolation coefficients of the preceding pixel points.

(1) Construct a one-dimensional Wiener-Hopf equation by using pixel points to be interpolated and integer pixel points and/or sub-pixel points in the row, column or in any other directions of the pixel points. The interpolation coefficients corresponding to the pixel points in the horizontal direction, vertical direction, and directions of positive and negative 45 degrees are calculated hereinbefore.

(2) Solve the Wiener-Hopf equation to obtain the interpolation coefficients corresponding to the integer pixel points and/or sub-pixel points in the row, column or in any other directions of the pixel points to be interpolated.

(3) Obtain the interpolation coefficients corresponding to the integer pixel points and/or sub-pixel points.

The following describes the pixel point interpolation filter method based on a specific embodiment.

After the interpolation coefficients to be used in each direction are calculated, these interpolation coefficients are obtained for the interpolation filter on the pixel points in the reference image.

As shown in FIG. 1, C4, D3, and D4 are integer pixel points adjacent to C3 in different directions; h and j are ½ sub-pixel points to be interpolated between these four integer pixel points; a, c, d, e, f, g, I, k, l, m, n, and o are ¼ sub-pixel points to be interpolated between these four integer pixel points.

The following describes the procedure for calculating the sub-pixel point interpolation.

Step 301: Obtain the pixel values of the integer pixel points in a row where sub-pixel points a, b, and c are located, that is, the pixel values of C1, C2, C3, C4, C5, and C6.

Step 302: Obtain the pre-calculated interpolation coefficient $h_i$ corresponding to the integer pixel points in the row, where i indicates the subscript of h that is used to differentiate interpolation coefficients.

Step 303: Calculate the interpolations of a, b, and c according to the obtained pixel values of six integer pixel points C1, C2, C3, C4, C5, and C6 and corresponding interpolation coefficients. The formulas are as follows:

$$b=(C1+C6)\cdot h_{1b}+(C2+C5)\cdot h_{2b}+(C3+C4)\cdot h_{3b};$$

$$a=C1\cdot h_{1a}+C2\cdot h_{2a}+C3\cdot h_{3a}+C4\cdot h_{4a}+C5\cdot h_{5a}+C6\cdot h_{6a};$$

$$c=C1\cdot h_{1c}+C2\cdot h_{2c}+C3\cdot h_{3c}+C4\cdot h_{4c}+C5\cdot h_{5c}+C6\cdot h_{6c};$$

The preceding formulas may be further simplified as follows:

$$b=C1\cdot h_{1b}+(C2+C5)\cdot h_{2b}+(C3+C4)\cdot h_{3b};$$

$$a=C1\cdot h_{1a}+C2\cdot h_{2a}+C3\cdot h_{3a}+C4\cdot h_{4a}+C5\cdot h_{5a}+C6\cdot h_{6a};$$

$$c=C2\cdot h_{2c}+C3\cdot h_{3c}+C4\cdot h_{4c}+C5\cdot h_{5c}+C6\cdot h_{6c};$$

Step 304: Obtain the pixel values of the integer pixel points in a column where sub-pixel points d, h, and l are located, that is, the pixel values of A3, B3, C3, D3, E3, and F3.

Step 305: Obtain the pre-calculated interpolation coefficient $h_i$ corresponding to the integer pixel points in the column, where i indicates the subscript of h that is used to differentiate interpolation coefficients.

Step 306: Calculate the interpolations of d, h, and l according to the obtained pixel values of A3, B3, C3, D3, E3, and F3 and corresponding interpolation coefficients. The formulas are as follows:

$$h=(A3+F3)\cdot h_{1h}+(B3+E3)\cdot h_{2h}+(C3+D3)\cdot h_{3h};$$

$$d=A3\cdot h_{1d}+B3\cdot h_{2d}+C3\cdot h_{3d}+D3\cdot h_{4d}+E3\cdot h_{5d}+F3\cdot h_{6d};$$

$$l=A3\cdot h_{1l}+B3\cdot h_{2l}+C3\cdot h_{3l}+D3\cdot h_{4l}+E3\cdot h_{5l}+F3\cdot h_{6l};$$

The preceding formulas may be further simplified as follows:

$$h=(A3+F3)\cdot h_{1h}+(B3+E3)\cdot h_{2h}+(C3+D3)\cdot h_{3h};$$

$$d=A3\cdot h_{1d}+B3\cdot h_{2d}+C3\cdot h_{3d}+D3\cdot h_{4d}+E3\cdot h_{5d};$$

$$l=B3\cdot h_{2l}+C3\cdot h_{3l}+D3\cdot h_{4l}+E3\cdot h_{5l}+F3\cdot h_{6l};$$

Step 307: Obtain pixel values of ½ sub-pixel points in a row where the ½ sub-pixel point j is located, that is, the pixel values of $b_A$, $b_B$, b, $b_D$, $b_E$, and $b_F$, where b indicates the pixel value of the ½ sub-pixel point calculated in step 301 to step 303; $b_A$, $b_B$, $b_D$, $b_E$, and $b_F$ are calculated by using an interpolation filter method same as that for calculating b according to the integer pixel points in a row where b is located.

Because point j is located at the center of four integer pixel points adjacent to C4, D3, D4, and C3, point j may obtain pixel values of ½ sub-pixel points in the row where point j is located, that is, the pixel values of H1, H2, h, H4, H5, and H6, where h indicates the pixel value of the ½ sub-pixel point calculated in step 304 to step 306; H1, H2, H4, H5, and H6 are calculated by using an interpolation filter method same as that for calculating h according to the integer pixel points in a column where h is located.

Step 308: Obtain the pre-calculated interpolation coefficient $h_i$ corresponding to the integer pixel points in the row or column, where i indicates the subscript of h that is used to differentiate interpolation coefficients.

Step 309: Calculate the interpolation of j according to the obtained pixel values of $b_A$, $b_B$, b, $b_D$, $b_E$, and $b_F$ and corresponding interpolation coefficients. The formula is as follows:

$$j=(b_A+b_F)h_{1j}+(b_Bb_E)h_{2j}+(b+b_D)h_{3j};$$

Or, calculate the interpolation of j according to the obtained pixel values of H1, H2, h, H4, H5, and H6 and corresponding interpolation coefficients. The formula is as follows:

$$j=(H_1+H_6)\cdot h_{1j}+(H_2+H_5)\cdot h_{2j}+(h+H_4)\cdot h_{3j};$$

Step 310: Obtain pixel values of ½ sub-pixel points in a column where sub-pixel points f and n are located, that is, the pixel values of $b_A$, $b_B$, b, $b_D$, $b_E$, and $b_F$.

Step 311: Obtain the pre-calculated interpolation coefficient $h_i$ corresponding to the ½ sub-pixel points in the column, where i indicates the subscript of h that is used to differentiate interpolation coefficients.

Step 312: Calculate the interpolations of f and n according to the obtained pixel values of $b_A$, $b_B$, b, $b_D$, $b_E$, and $b_F$ and corresponding interpolation coefficients. The formulas are as follows:

$$f=b_A\cdot h_{1f}+b_B\cdot h_{2f}+b\cdot h_{3f}+b_D\cdot h_{4f}+b_E\cdot h_{5f}+b_F\cdot h_{6f};$$

$$n=b_A\cdot h_{1n}+b_B\cdot h_{2n}+b\cdot h_{3n}+b_D\cdot h_{4n}+b_E\cdot h_{5n}+b_F\cdot h_{6n};$$

The preceding formulas may be further simplified as follows:

$$f=b_A\cdot h_{1f}+b_B\cdot h_{2f}+b\cdot h_{3f}+b_D\cdot h_{4f}+b_E\cdot h_{5f};$$

$$n=b_B\cdot h_{2n}+b\cdot h_{3n}+b_D\cdot h_{4n}+b_E\cdot h_{5n}+b_F\cdot h_{6n};$$

Step 313: Obtain pixel values of ½ sub-pixel points in a row where sub-pixel points I and k are located, that is, the pixel values of H1, H2, h, H4, H5, and H6.

Step 314: Obtain pre-calculated interpolation coefficient $h_i$ corresponding to the ½ sub-pixel points in the row, where i indicates the subscript of h that is used to differentiate interpolation coefficients.

Step 315: Calculate the interpolations of i and k according to the obtained pixel values of H1, H2, h, H4, H5, and H6 and corresponding interpolation coefficients. The formulas are as follows:

$$i=H_1\cdot h_{1i}+H_2\cdot h_{2i}+h\cdot h_{3i}+H_4\cdot h_{4i}+H_5\cdot h_{5i}+H_6\cdot h_{6i};$$

$$k=H_1\cdot h_{1k}+H_2\cdot h_{2k}+h\cdot h_{3k}+H_4\cdot h_{4k}+H_5\cdot h_{5k}+H_6\cdot h_{6k};$$

The preceding formulas may be further simplified as follows:

$$i=H_1\cdot h_{1i}+H_2\cdot h_{2i}+h\cdot h_{3i}+H_4\cdot h_{4i}+H_5\cdot h_{5i};$$

$$k=H_2\cdot h_{2k}+h\cdot h_{3k}+H_4\cdot h_{4k}+H_5\cdot h_{5k}+H_6\cdot h_{6k};$$

Step 316: Obtain the pixel values of integer pixel points and ½ sub-pixel point j in a direction of negative 45 degrees where sub-pixel points e and o are located, that is, the pixel value of A1, B2, C3, D4, E5, F6, and j.

Step 317: Obtain the pre-calculated interpolation coefficient $h_i$ corresponding to the integer pixel point and ½ sub-pixel points in the direction of negative 45 degrees, where i indicates the subscript of h that is used to differentiate interpolation coefficients.

Step 318: Calculate the interpolations of e and o according to the obtained pixel values of A1, B2, C3, D4, E5, F6, and j and corresponding interpolation coefficients. The formulas are as follows:

$$e=A1\cdot h_{1e}+B2\cdot h_{2e}+C3\cdot h_{3e}+j\cdot h_{4e}+D4\cdot h_{5e}+E5\cdot h_{6e};$$

$$o=B2\cdot h_{1o}+C3\cdot h_{2o}+j\cdot h_{3o}+D4\cdot h_{4o}+E5\cdot h_{5o}+F6\cdot h_{6o};$$

The preceding formulas may be further simplified as follows:

$$e = A1 \cdot h_{1e} + B2 \cdot h_{2e} + C3 \cdot h_{3e} + j \cdot h_{4e} + D4 \cdot h_{5e};$$

$$o = C3 \cdot h_{2o} + j \cdot h_{3o} + D4 \cdot h_{4o} + E5 \cdot h_{5o} + F6 \cdot h_{6o};$$

Step 319: Obtain the pixel values of integer pixel points and ½ sub-pixel point j in a direction of positive 45 degrees where sub-pixel points g and m are located, that is, the pixel value of A6, B5, C4, D3, E2, F1, and j.

Step 320: Obtain the pre-calculated interpolation coefficient $h_i$ corresponding to the integer pixel points and ½ sub-pixel points in the direction of positive 45 degrees, where i indicates the subscript of h that is used to differentiate interpolation coefficients.

Step 321: Calculate the interpolations of g and m according to the obtained pixel values of A6, B5, C4, D3, E2, F1, and j and corresponding interpolation coefficients. The formulas are as follows:

$$g = A6 \cdot h_{1g} + B5 \cdot h_{2g} + C4 \cdot h_{3g} + j \cdot h_{4g} + D3 \cdot h_{5g} + E2 \cdot h_{6g};$$

$$m = F1 \cdot h_{1m} + E2 \cdot h_{2m} + D3 h_{3m} + j \cdot h_{4m} + C4 \cdot h_{5m} + B5 \cdot h_{6m};$$

The preceding formulas may be further simplified as follows:

$$g = A6 \cdot h_{1g} + B5 \cdot h_{2g} + C4 \cdot h_{3g} + j \cdot h_{4g} + D3 \cdot h_{5g};$$

$$m = E2 \cdot h_{2m} + D3 \cdot h_{3m} + j \cdot h_{4m} + C4 \cdot h_{5m} + B5 \cdot h_{6m};$$

When four ¼ sub-pixel points e, o, g, and m are interpolated by using pixel points in the directions of positive and negative 45 degrees, the interpolation is not completely based on six integer pixel points because the pixel points in such directions are far from the four ¼ sub-pixel points. Instead, a ½ sub-pixel point (j) that is adjacent to the four ¼ sub-pixel points is used. For example, the interpolation of e is calculated by using A1, B2, C3, D4, and E5. The value of j used during the calculation of interpolations of e, o, g, and m may be calculated by using one of the two methods in step 307 to step 309.

It is evident that ½ sub-pixel points are used when the interpolations of 12 ¼ sub-pixel points are calculated in this embodiment. Thus, the interpolation coefficients of ½ sub-pixel points b, h, and j must be obtained to interpolate these three points. Then, the interpolation coefficients of the ¼ sub-pixel points are calculated to interpolate these three points.

The process includes: constructing a one-dimensional Wiener-Hopf equation by using the sub-pixel points of the first accuracy (that is, ½ sub-pixel points b, h, and j) and integer pixel points in the row, column or in any other directions of these sub-pixel points; solving the one-dimensional Wiener-Hopf equation to obtain interpolation coefficients corresponding to the sub-pixel points b, h, and j; constructing a one-dimensional Wiener-Hopf equation by using sub-pixel points of the second accuracy (that is, 12 ¼ sub-pixel points, namely, a, c, d, e, f, g, I, k, l, m, n, and o) and integer pixel points and/or sub-pixel points b, h, and j of the first accuracy in the row, column or in any other directions of the 12 sub-pixel points; solving the one-dimensional Wiener-Hopf equation to obtain the interpolation coefficients for interpolating the sub-pixel points of the second accuracy.

In this embodiment, when ½ sub-pixel point j and ¼ sub-pixel points f, n, I, and k are interpolated, interpolations of ½ sub-pixel points in column b of the ½ sub-pixel points or in row h of the ½ sub-pixel points are used, that is, the interpolations of $b_A$, $b_B$, b, $b_D$, $b_E$, $b_F$ or the interpolations of H1, H2, h, H4, H5, and H6. To calculate the interpolations of ½ sub-pixel point j and ¼ sub-pixel points f, n, i, and k, intermediate points such as $b_A$, $b_B$, b, $b_D$, $b_E$, and $b_F$, or H1, H2, h, H4, H5, and H6 may be interpolated by using a preset fixed interpolation coefficient. In addition, high-accuracy ½ sub-pixel points or ¼ sub-pixel points such as j, f, n, I, and k may be interpolated by using interpolation coefficients written to the bit stream. In this way, the image interpolation method may be simplified, and the encoding and decoding efficiency may be improved.

In the second embodiment of the image interpolation method, the sub-pixel point interpolation methods include the one-dimensional horizontal interpolation method, one-dimensional vertical interpolation method, and one-dimensional interpolation in the directions of positive and negative 45 degrees. Each sub-pixel point is interpolated in these three directions, which can improve the interpolation effect and search accuracy of sub-pixel points. In addition, the ½ sub-pixel point interpolation information is fully used to calculate the ¼ sub-pixel point interpolations, making it compatible with the video encoding and decoding technology in the prior art. The value of interpolation coefficient $h_i$ varies with the positions of pixel points. This overcomes the weakness of the prior art in which the encoding and decoding efficiency is low because the interpolation calculation is simplified by using a fixed interpolation coefficient.

It is understandable to those skilled in the art that all or part of the steps in the preceding embodiments may be implemented by hardware instructed by a program. The program may be stored in a computer readable storage medium. When the program is executed, the processes of the preceding methods are executed. The storage medium may be a magnetic disk, a compact disk read-only memory (CD-ROM), a read-only memory (ROM) or a random access memory (RAM).

Figure 4:
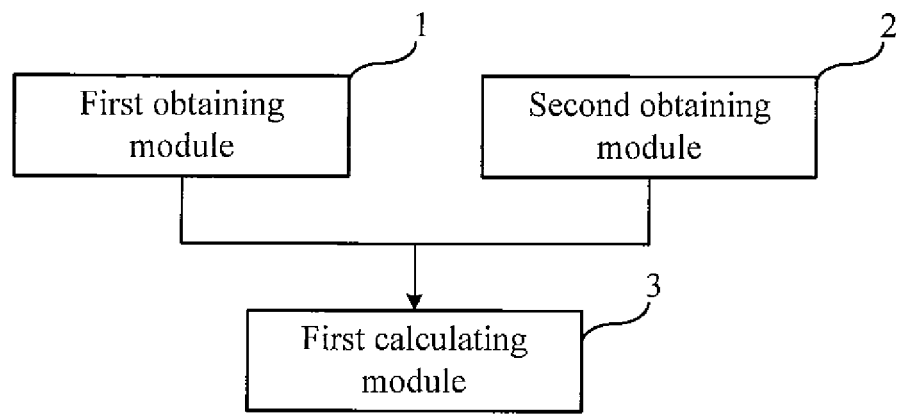
FIG. 4 shows a structure of a first embodiment of an image interpolation apparatus according to the present invention.

FIG. 4 shows a structure of a first embodiment of an image interpolation apparatus according to the present invention. The image interpolation apparatus includes:

a first obtaining module 1, adapted to obtain pixel values of integer pixel points and/or sub-pixel points in the row, column or in any other directions of pixel points, where the sub-pixel points are pixel points between the adjacent integer pixel points;

a second obtaining module 2, adapted to obtain pre-calculated interpolation coefficients corresponding to the integer pixel points and/or sub-pixel points in the row, column or in any other directions of the pixel points; and a first calculating module 3, adapted to interpolate the pixel points according to the pixel values of the integer pixel points or sub-pixel points obtained from the first obtaining module 1 and corresponding interpolation coefficients obtained from the second obtaining module 2.

In this embodiment, the pixel point interpolation apparatus obtains the pixel points in the horizontal direction, vertical direction and any other directions and corresponding interpolation coefficients, and calculates interpolations of the pixel points. Different pixel points are interpolated in different directions. Thus, the interpolation calculation effect and the search accuracy of sub-pixel points are improved.

Figure 5:
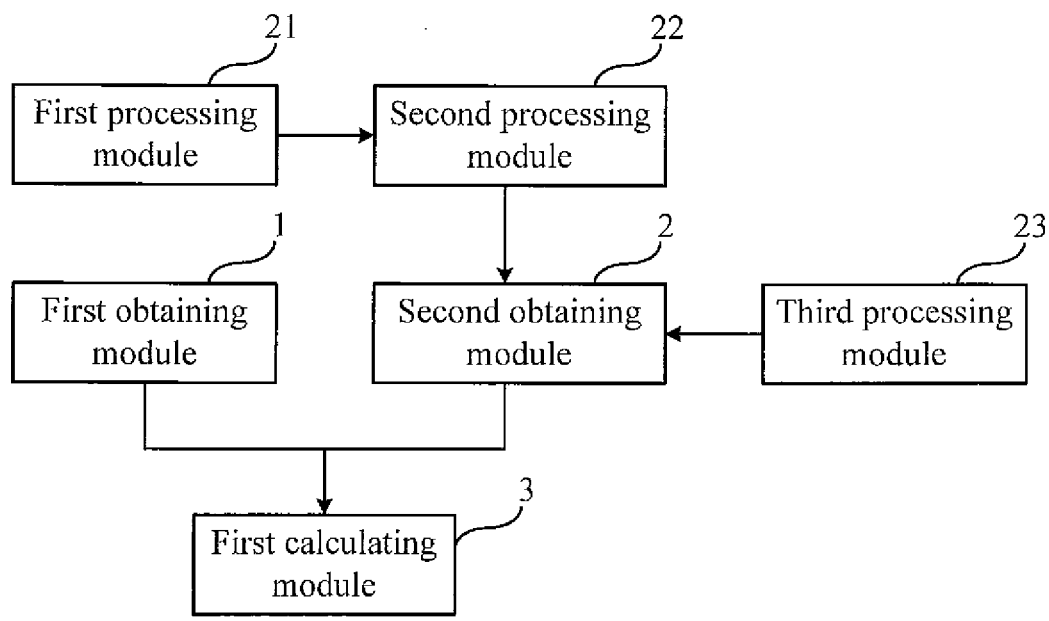
FIG. 5 shows a structure of a second embodiment of the image interpolation apparatus according to the present invention.

FIG. 5 shows a structure of a second embodiment of the image interpolation apparatus according to the present invention. Besides the preceding first obtaining module 1, the second obtaining module 2, and the first calculating module 3, the image interpolation apparatus further includes:

a first processing module 21, adapted to construct a one-dimensional Wiener-Hopf equation by using the pixel points and the integer pixel points and/or sub-pixel points in the row, column or in any other directions of the pixel points; and a second processing module 22, adapted to: solve the one-dimensional Wiener-Hopf equation constructed by the first processing module 21 to obtain interpolation coefficients corresponding to the integer pixel points and/or sub-pixel points in the row, column or in any other directions of the pixel points, and send the interpolation coefficients to the second obtaining module 2.

On the basis of the first processing module 21 and second processing module 22, the apparatus may further include a third processing module 23, adapted to solve the interpolations of some sub-pixel points by using preset fixed interpolation coefficients. For example, for points b and h in the preceding embodiment of the interpolation method, the second obtaining module 2 may obtain corresponding interpolation coefficients from the third processing module 23.

It should be noted that the above embodiments are merely provided for elaborating the technical solutions of the present invention, but not intended to limit the present invention. Although the present invention has been described in detail with reference to the foregoing embodiments, it is apparent that those skilled in the art can make various modifications and variations to the invention without departing from the spirit and scope of the invention. The invention shall cover the modifications and variations provided that they fall within the scope of protection defined by the following claims or their equivalents.

What is claimed is:

1. An image interpolation method, wherein an image comprises multiple pixel points and the pixel points are arranged in a two-dimensional matrix composed of rows in a horizontal direction and columns in a vertical direction, the method comprising:
    obtaining pixel values of a first set of pixel points in a same row as a first pixel point, the row being in a horizontal direction;
    obtaining a first set of interpolation coefficients corresponding to the first set of pixel points;
    interpolating the first pixel point based on the pixel values of the first set of pixel points and the first set of interpolation coefficients;
    obtaining pixel values of a second set of pixel points in a same column as a second pixel point the column being in a vertical direction;
    obtaining a second set of interpolation coefficients corresponding to the second set of pixel points;
    interpolating the second pixel point based on the pixel values of the second set of pixel points and the second set of interpolation coefficients;
    obtaining pixel values of a third set of pixel points in a same line as a third pixel point, the line being in a direction of positive 45 degrees or negative 45 degrees;
    obtaining a third set of interpolation coefficients corresponding to the third set of pixel points; and
    interpolating the third pixel point based on the pixel values of the third set of pixel points and the third set of interpolation coefficients,
wherein an interpolation formula of the interpolating the first pixel point is:
    $a = A_1 \cdot h_{1a} + A_2 \cdot h_{2a} + A_3 \cdot h_{3a} + \ldots + A_M \cdot h_{Ma}$, wherein a indicates the pixel value of the first pixel point, $A_1, A_2, \ldots, A_M$ indicate the pixel values of the first set of pixel points, $h_{1a}, h_2a, \ldots, h_{Ma}$ indicate the first set of interpolation coefficients, and M is a positive integer.

2. The method according to claim 1, wherein the first set of interpolation coefficients is obtained via a first one-dimensional Wiener-Hopf equation constructed from the first set of pixel points, the second set of interpolation coefficients is obtained via a second one-dimensional Wiener-Hopf equation constructed from the second set of pixel points, and the third set of interpolation coefficients is obtained via a third one-dimensional Wiener-Hopf equation constructed from the third set of pixel points.

3. The method according to claim 1, wherein the first set of pixel points comprises a sub-pixel point, and the accuracy of the first pixel point is equal to or higher than the accuracy of the sub-pixel point.

4. The method according to claim 1, wherein the first set of pixel points comprises integer pixel points, and the first pixel point is a sub-pixel point.

5. The method according to claim 1, wherein the second set of pixel points comprises a sub-pixel point, and the accuracy of the second pixel point is equal to or higher than the sub-pixel point.

6. The method according to claim 1, wherein the second set of pixel points comprises integer pixel points, and the second pixel point is a sub-pixel point.

7. The method according to claim 1, wherein the third set of pixel points comprises a sub-pixel point, and the accuracy of the third pixel point is equal to or higher than the sub-pixel point.

8. The method according to claim 1, wherein the third set of pixel points comprises integer pixel points, and the third pixel point is a sub-pixel point.

9. An image interpolation method, wherein an image comprises multiple pixel points and the pixel points are arranged in a two-dimensional matrix composed of rows in a horizontal direction and columns in a vertical direction, the method comprising:
    obtaining pixel values of a first set of pixel points in a same row as a first pixel point, the row being in a horizontal direction;
    obtaining a first set of interpolation coefficients corresponding to the first set of pixel points;
    interpolating the first pixel point based on the pixel values of the first set of pixel points and the first set of interpolation coefficients;
    obtaining pixel values of a second set of pixel points in a same column as a second pixel point, the column being in a vertical direction;
    obtaining a second set of interpolation coefficients corresponding to the second set of pixel points;
    interpolating the second pixel point based on the pixel values of the second set of pixel points and the second set of interpolation coefficients;
    obtaining pixel values of a third set of pixel points in a same line as a third pixel point, the line being in a direction of positive 45 degrees or negative 45 degrees;
    obtaining a third set of interpolation coefficients corresponding to the third set of pixel points; and
    interpolating the third pixel point based on the pixel values of the third set of pixel points and the third set of interpolation coefficients,
wherein an interpolation formula of the interpolating the second pixel point is:
    $b = B_1 \cdot h_{1b} + B_2 \cdot h_{2b} + B_3 \cdot h_{3b} + \ldots + B_N \cdot h_{Nb}$, wherein b indicates the pixel value of the second pixel point, $B_1, B_2, \ldots, B_N$ indicate the pixel values of the second set of pixel points, $h_{1b}, h_{2b}, \ldots, h_{Nb}$ indicate the second set of interpolation coefficients, and N is a positive integer.

10. An image interpolation method, wherein an image comprises multiple pixel points and the pixel points are arranged in a two-dimensional matrix composed of rows in a horizontal direction and columns in a vertical direction, the method comprising:

obtaining pixel values of a first set of pixel points in a same row as a first pixel point, the row being in a horizontal direction;

obtaining a first set of interpolation coefficients corresponding to the first set of pixel points;

interpolating the first pixel point based on the pixel values of the first set of pixel points and the first set of interpolation coefficients;

obtaining pixel values of a second set of pixel points in a same column as a second pixel point the column being in a vertical direction;

obtaining a second set of interpolation coefficients corresponding to the second set of pixel points;

interpolating the second pixel point based on the pixel values of the second set of pixel points and the second set of interpolation coefficients;

obtaining pixel values of a third set of pixel points in a same line as a third pixel point, the line being in a direction of positive 45 degrees or negative 45 degrees;

obtaining a third set of interpolation coefficients corresponding to the third set of pixel points; and interpolating the third pixel point based on the pixel values of the third set of pixel points and the third set of interpolation coefficients, wherein an interpolation formula of the interpolating the third pixel point is one of the following:

$c = C_1 \cdot h_{1c} + C_2 \cdot h_{2c} + C_3 \cdot h_{3c} + \ldots + C_I \cdot h_{Ic}$, wherein c indicates the pixel value of the third pixel point, $C_1, C_2, \ldots, C_I$ indicate the pixel values of the third set of pixel points, $h_{1c}, h_{2c}, \ldots, h_{Ic}$ indicate the third set of interpolation coefficients, and I is a positive integer; and $d = D_1 \cdot h_{1d} + D_2 \cdot h_{2d} + D_3 \cdot h_{3d} + \ldots + D_K \cdot h_{Kd}$, wherein d indicates the pixel value of the third pixel point, $D_1, D_2, \ldots, D_K$ indicate the pixel values of the third set of pixel points, $h_{1d}, h_{2d}, \ldots, h_{Kd}$ indicate the third set of interpolation coefficients, and K is a positive integer.

11. A method for obtaining image interpolation coefficients for a pixel point, the method comprising:

constructing a one-dimensional Wiener-Hopf equation from any of the following:
  a set of pixel points in a same row as a first pixel point, the row being in a horizontal direction,
  a set of pixel points in a same column as the first pixel point, the column being in a vertical direction, and
  a set of pixel points in a same line as the first pixel point, the line being in a direction of positive 45 degrees or negative 45 degrees; and solving the one-dimensional Wiener-Hopf equation to obtain interpolation coefficients for the first pixel point, wherein the set of pixel points, from which the one-dimensional Wiener-Hopf equation is constructed, comprises a sub-pixel point, and the accuracy of the first pixel point is equal to or higher than the accuracy of the sub-pixel point, and wherein the interpolation coefficients for the first pixel point are designated for interpolating the first pixel point via the following formula:

$a = A_1 \cdot h_{1a} + A_2 \cdot h_{2a} + A_3 \cdot h_{3a} + \ldots + A_M \cdot h_{Ma}$, wherein a indicates the pixel value of the first pixel point, $A_1, A_2, \ldots, A_M$ indicate the pixel values of the first set of pixel points, $h_{1a}, h_2a, \ldots, h_{Ma}$ indicate the first set of interpolation coefficients, and M is a positive integer.

12. An image interpolation apparatus, comprising:
a memory for storing instructions; and
a processor coupled to the memory configured to execute the instructions to allow the apparatus to:

obtain pixel values of a first set of pixel points in a same row as a first pixel point, the row being in a horizontal direction;

obtain a first set of interpolation coefficients corresponding to the first set of pixel points;

interpolate the first pixel point based on the pixel values of the first set of pixel points and the first set of interpolation coefficients;

obtain pixel values of a second set of pixel points in a same column as a second pixel point, the column being in a vertical direction;

obtain a second set of interpolation coefficients corresponding to the second set of pixel points;

interpolate the second pixel point based on the pixel values of the second set of pixel points and the second set of interpolation coefficients;

obtain pixel values of a third set of pixel points in a same line as a third pixel point, the line being in a direction of positive 45 degrees or negative 45 degrees;

obtain a third set of interpolation coefficients corresponding to the third set of pixel points; and interpolate the third pixel point based on the pixel values of the third set of pixel points and the third set of interpolation coefficients, wherein the first set of interpolation coefficients are designated for interpolating the first pixel point via the following formula:

$a = A_1 \cdot h_{1a} + A_2 \cdot h_{2a} + A_3 \cdot h_{3a} + \ldots + A_M \cdot h_{Ma}$, wherein a indicates the pixel value of the first pixel point, $A_1, A_2, \ldots, A_M$ indicate the pixel values of the first set of pixel points, $h_{1a}, h_2a, \ldots, h_{Ma}$ indicate the first set of interpolation coefficients, and M is a positive integer.

13. An image interpolation apparatus, comprising:
a memory for storing instructions; and
a processor coupled to the memory configured to execute the instructions to allow the apparatus to:

construct a one-dimensional Wiener-Hopf equation from any of the following:
  a set of pixel points in a same row as a first pixel point, the row being in a horizontal direction,
  a set of pixel points in a same column as the first pixel point, the column being in a vertical direction, and
  a set of pixel points in a same line as the first pixel point, the line being in a direction of positive 45 degrees or negative 45 degrees; and solve the one-dimensional Wiener-Hopf equation to obtain interpolation coefficients for the first pixel point, wherein the set of pixel points, from which the one-dimensional Wiener-Hopf equation is constructed, comprises a sub-pixel point, and the accuracy of the first pixel point is equal to or higher than the accuracy of the sub-pixel point, and wherein the interpolation coefficients for the first pixel point are designated for interpolating the first pixel point via the following formula:

$a = A_1 \cdot h_{1a} + A_2 \cdot h_{2a} + A_3 \cdot h_{3a} + \ldots + A_M \cdot h_{Ma}$, wherein a indicates the pixel value of the first pixel point, $A_1, A_2, \ldots, A_M$ indicate the pixel values of the first set of pixel points, $h_{1a}, h_2a, \ldots, h_{Ma}$ indicate the first set of interpolation coefficients, and M is a positive integer.

* * * * *